United States Patent
Hegde et al.

(10) Patent No.: US 11,356,485 B2
(45) Date of Patent: Jun. 7, 2022

(54) PRE-SIGNED URLS WITH CUSTOM POLICIES FOR DATA ACCESS IN AN OBJECT STORAGE SYSTEM

(71) Applicant: International Business Machines Corporation, Armonk, NY (US)

(72) Inventors: Harsha Hegde, Buffalo Grove, IL (US); Nicholas G. Lange, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 16/457,178

(22) Filed: Jun. 28, 2019

(65) Prior Publication Data

US 2020/0412768 A1    Dec. 31, 2020

(51) Int. Cl.
*H04L 9/40* (2022.01)
*G06F 16/23* (2019.01)
*G06F 16/955* (2019.01)

(52) U.S. Cl.
CPC ........ *H04L 63/205* (2013.01); *G06F 16/2365* (2019.01); *G06F 16/9566* (2019.01); *H04L 63/10* (2013.01)

(58) Field of Classification Search
CPC ..... H04L 63/10; H04L 63/205; G06F 16/955; G06F 16/9566; G06F 16/2365
See application file for complete search history.

(56) References Cited

U.S. PATENT DOCUMENTS

| | | | |
|---|---|---|---|
| 8,365,271 B2* | 1/2013 | Blum | H04L 63/10 713/153 |
| 9,819,648 B1 | 11/2017 | Chilakapati et al. | |
| 9,864,874 B1 | 1/2018 | Shanbhag et al. | |
| 9,973,481 B1 | 5/2018 | Sharifi Mehr | |
| 10,178,083 B2* | 1/2019 | Resch | G06F 21/604 |
| 10,783,208 B1* | 9/2020 | Rao | G06F 16/9577 |
| 2009/0217354 A1* | 8/2009 | Blum | H04L 61/30 726/3 |
| 2010/0125562 A1* | 5/2010 | Nair | G06F 16/951 707/E17.108 |
| 2012/0290631 A1 | 11/2012 | Grube et al. | |

(Continued)

*Primary Examiner* — Jeong S Park
(74) *Attorney, Agent, or Firm* — Randy E. Tejeda; Andrew D. Wright; Roberts Calderon Safran & Cole, P.C.

(57) ABSTRACT

A method for execution by an access layer of an object storage system includes In various embodiments, a processing system of an access layer of an object storage system includes at least one processor and a memory that stores operational instructions, that when executed by the at least one processor cause the processing system to receive a request message from a requesting entity via a network, where the request message includes a pre-signed URL. A set of custom policy parameters are extracted from the pre-signed URL. Policy verification data is generated by comparing each attribute of a determined set of attributes of the access request to a corresponding custom policy parameter of the set of custom policy parameters. An access indicated in the request message is executed in response to the policy verification data indicating that each attribute compares favorably to the corresponding custom policy parameter.

20 Claims, 12 Drawing Sheets

(56) References Cited

U.S. PATENT DOCUMENTS

| | | | |
|---|---|---|---|
| 2013/0347094 A1* | 12/2013 | Bettini | G06F 21/577 |
| | | | 726/11 |
| 2014/0351891 A1* | 11/2014 | Grube | G06F 11/0727 |
| | | | 726/3 |
| 2017/0149740 A1* | 5/2017 | Mansour | H04L 63/045 |
| 2017/0293626 A1 | 10/2017 | Dageville et al. | |
| 2017/0364539 A1 | 12/2017 | Jacob et al. | |
| 2018/0109540 A1* | 4/2018 | Amar | G06F 21/335 |
| 2018/0146037 A1* | 5/2018 | Figueroa | H04L 67/1097 |
| 2019/0068560 A1 | 2/2019 | Roth et al. | |
| 2019/0349405 A1* | 11/2019 | Bengtson | H04L 67/18 |
| 2020/0327244 A1* | 10/2020 | Blass | G06F 21/6227 |

\* cited by examiner

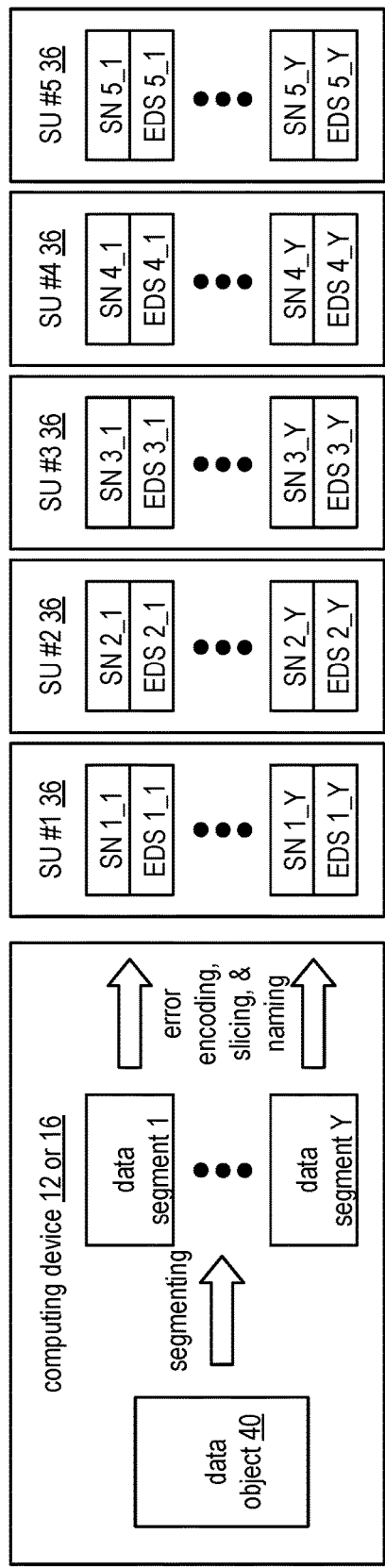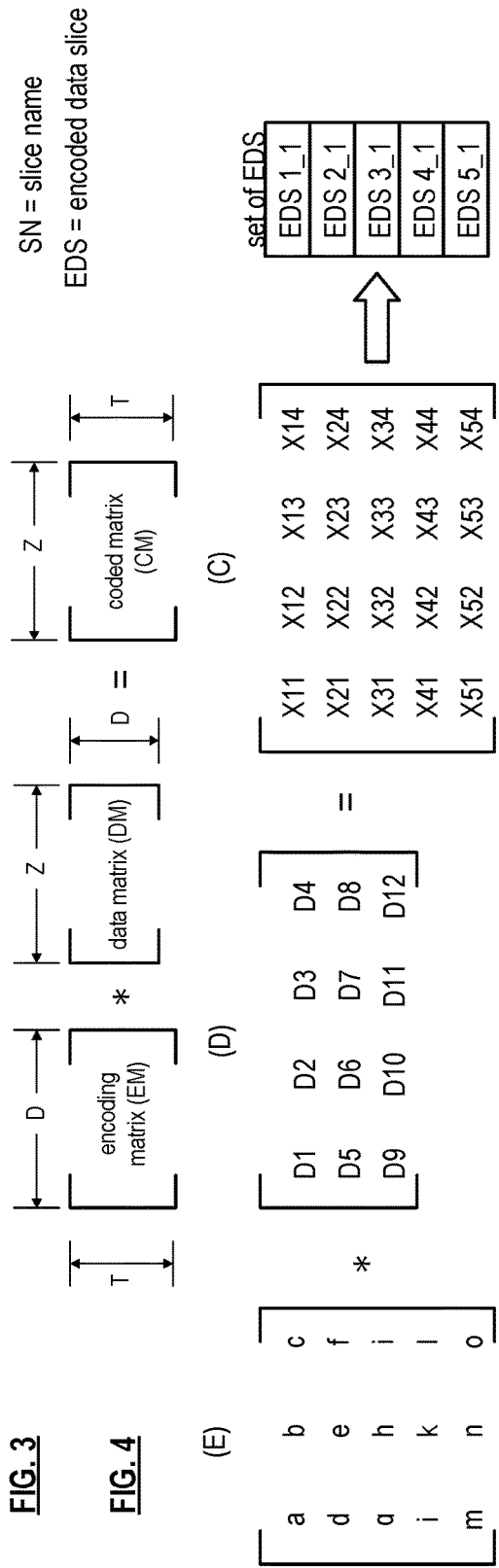
FIG. 3
FIG. 4
FIG. 5
FIG. 6

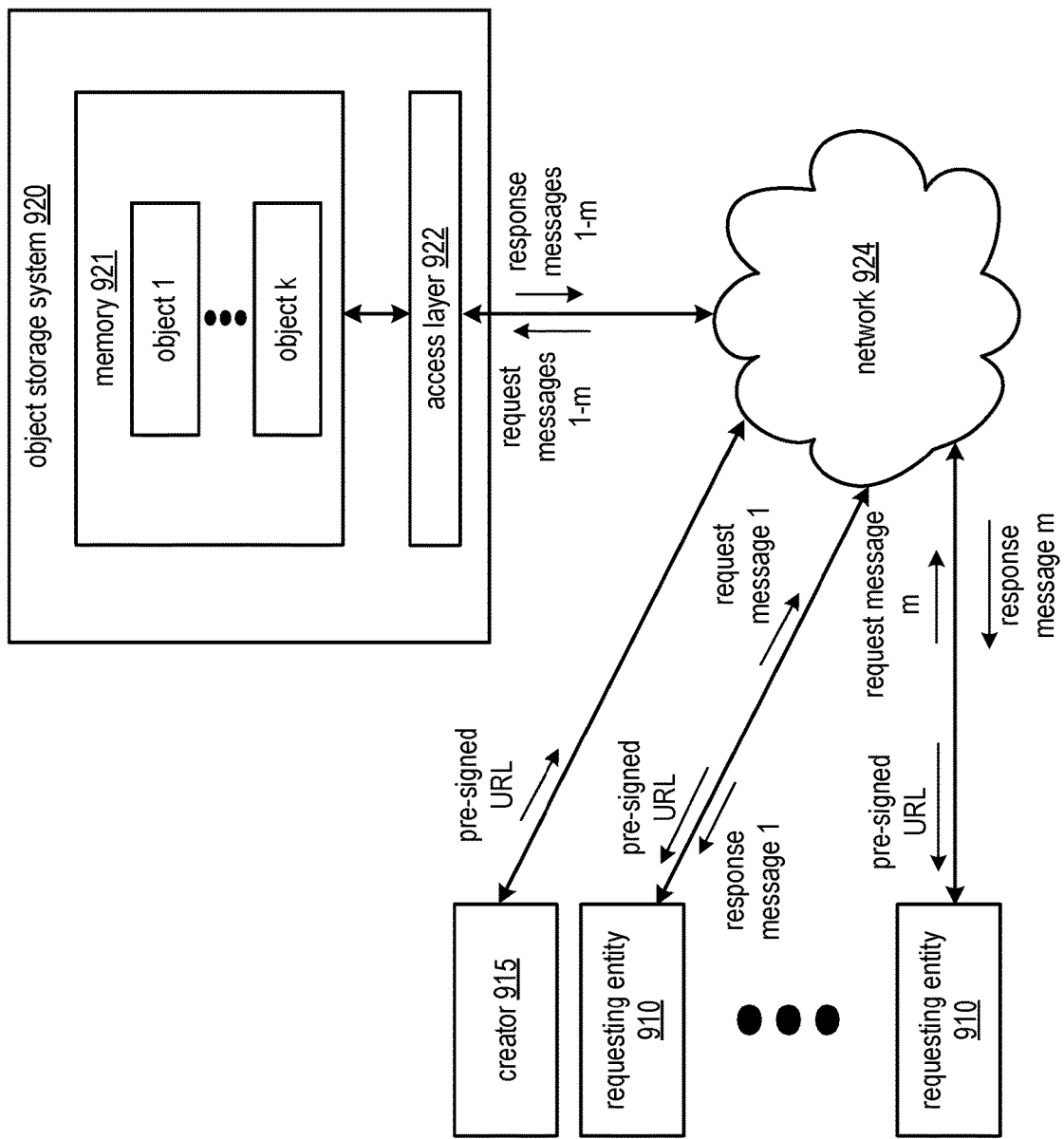

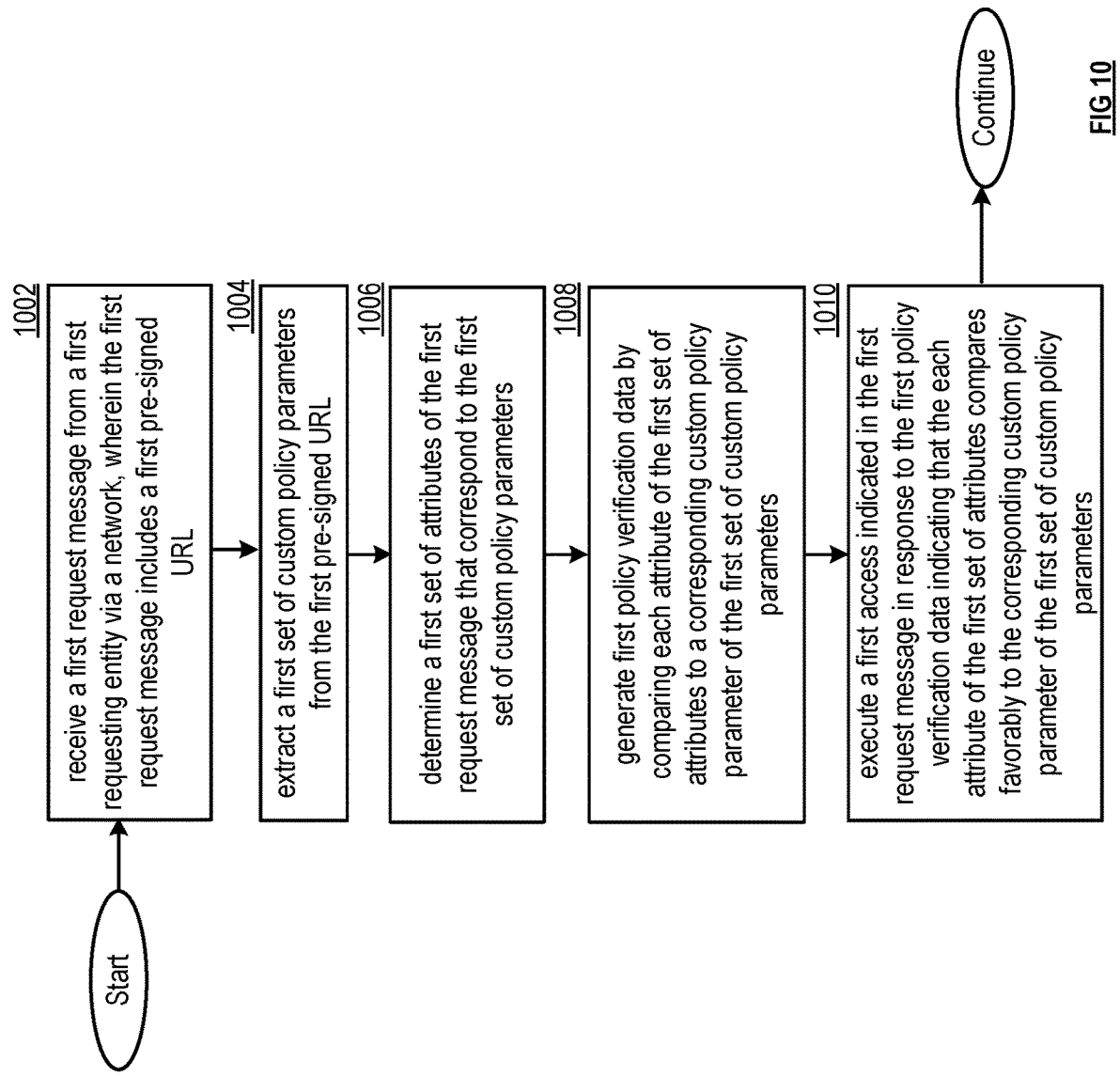

PRE-SIGNED URLS WITH CUSTOM POLICIES FOR DATA ACCESS IN AN OBJECT STORAGE SYSTEM

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 9A is a schematic block diagram of an embodiment of an object storage system in accordance with various embodiments of the present invention;

FIG. 10 is a logic diagram of an example of a method of processing pre-signed URLs in accordance with the present invention.

DETAILED DESCRIPTION OF THE INVENTION

Figure 1:
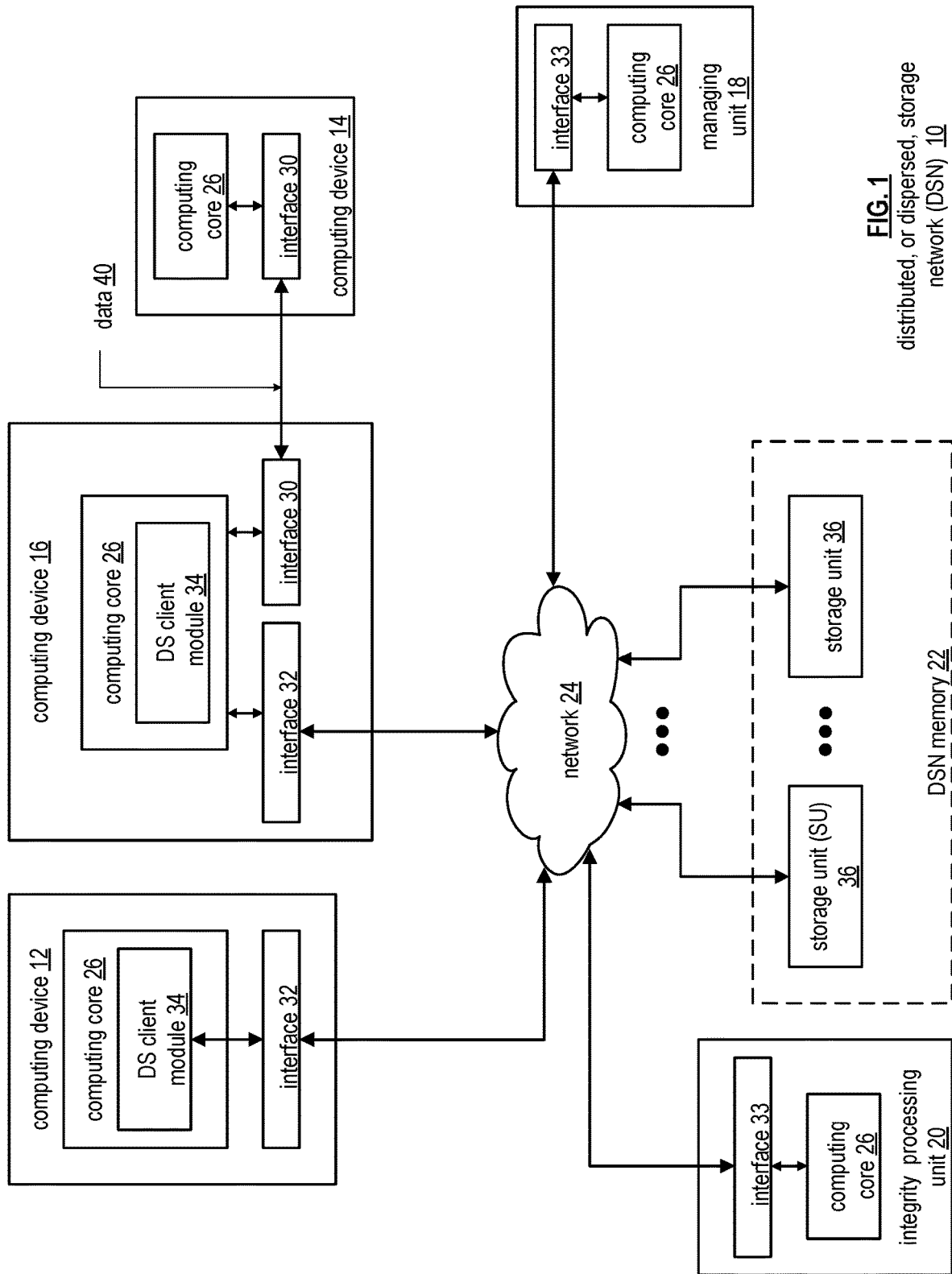
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; one or more satellite communication systems; one or more fiber optic communication systems; and/or one or more local area networks (LAN) and/or wide area networks (WAN).

Figure 2:
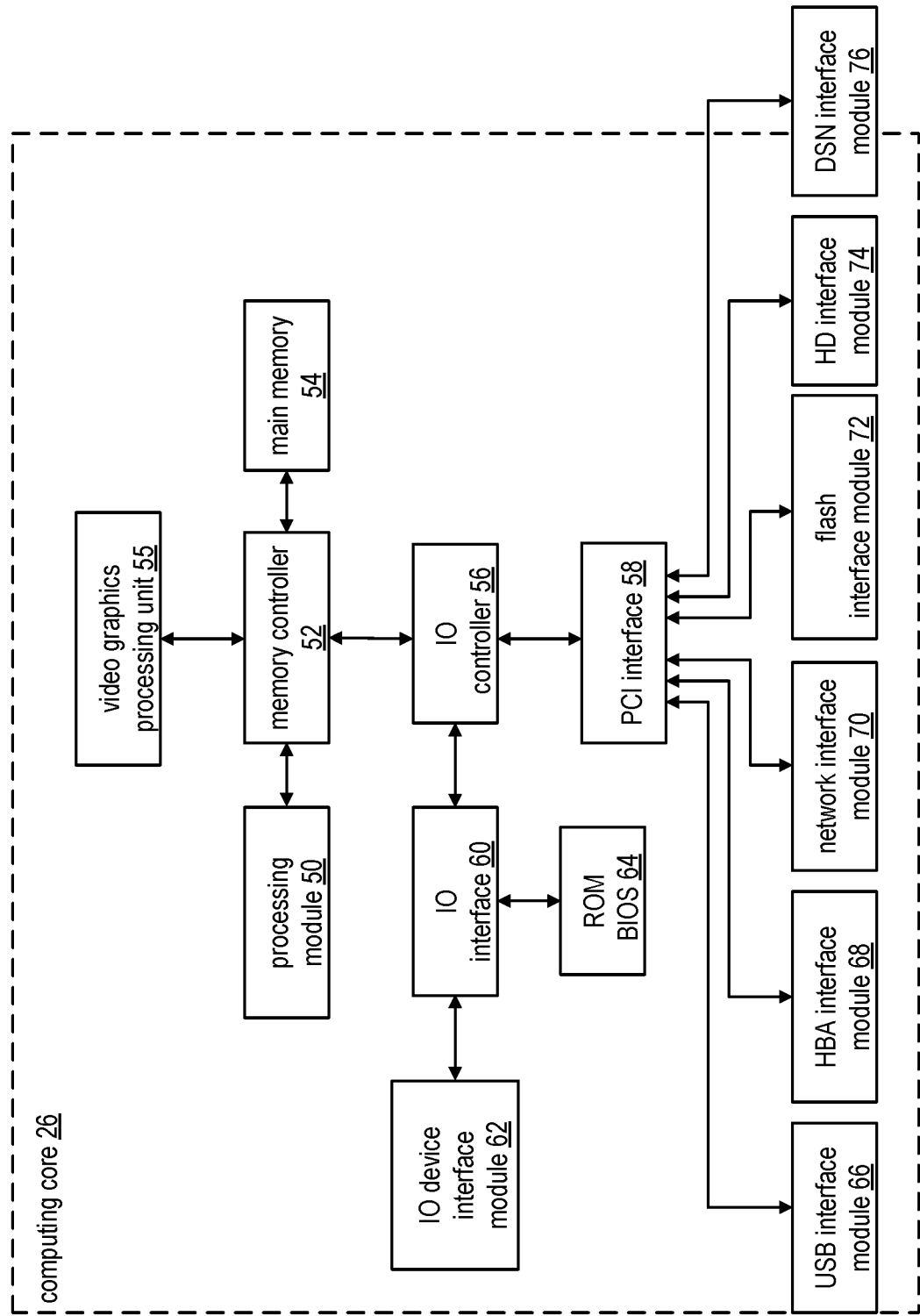
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.). As used herein, the dispersed storage error encoding parameters can be interchangeably referred to as IDA parameters, and T can be interchangeable referred to an IDA width threshold of a dispersed storage error encoding function.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
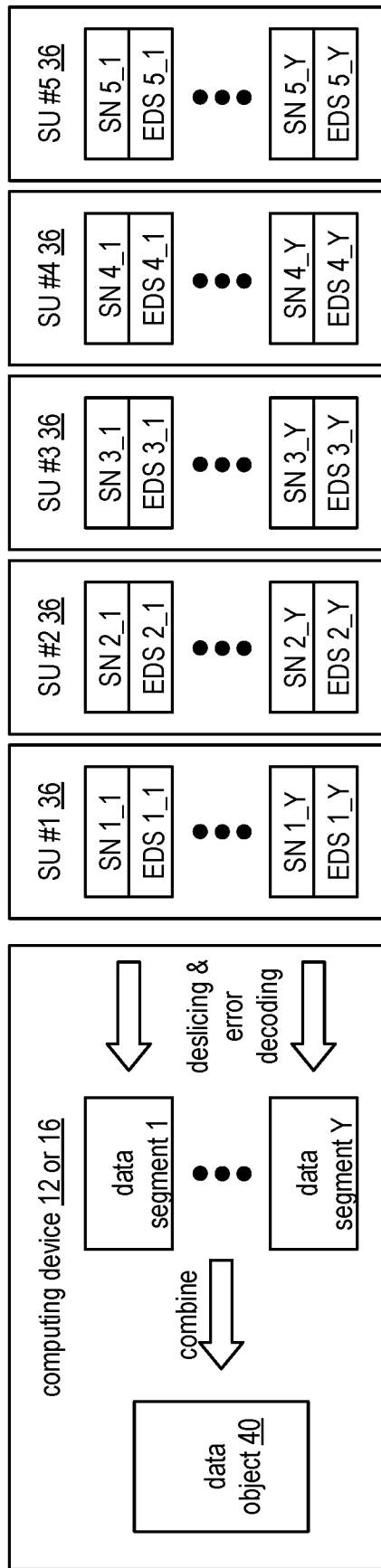
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

The DSN can further include the user device 14 and/or computing device 16 of FIG. 1, operable to send access requests to the storage units via network 24. The access requests can include data slices to be written to storage, read requests, and/or task requests. The user device 14 and/or computing device 16 can receive data slices stored by the storage units in response. One or more computing devices 16 and/or user devices 14 can generate the data slices for storage by performing a dispersed storage error encoding function on a set of data segments for storage, where the encoded data slices of a data segment are transmitted to an information dispersal algorithm (IDA) width threshold number of storage units. One or more computing devices 16 and/or user devices 14 can recover a data segment by retrieving at least an IDA decode threshold number of encoded data slices from at least a corresponding IDA decode threshold number of storage units, and by performing a dispersed storage error decoding function on the received encoded data slices.

FIG. 9A is a schematic block diagram of an embodiment of an object storage system 920 that stores a plurality of data objects 1-k in at least one memory 921 of the object storage system. At least one requesting entity 910 can communicate with the object storage system 920, for example, via a network 924. Each requesting entity 910 can transmit request messages to the object storage system and/or can receive response messages from the object storage system 920.

The network 924 can be implemented by utilizing the network 24 of FIG. 1 and/or can be implemented by utilizing any wired and/or wireless communication between access layer 922 and requesting entity 910. The object storage system 920 can be implemented by utilizing the cloud computing environment of FIG. 11.

Some or all requesting entities 910 can be implemented by utilizing a computing device 16 and/or a user device 14 of FIG. 1. Alternatively or in addition, some or all requesting entities 910 can include a computing core 26 and/or can include at least one processor and memory. Some or all requesting entities can be implemented by utilizing a client device that displays a graphical user interface to a user via a display device of the client device. For example, the client device can generate data based on user input provided to the graphical user interface by the user in response to prompts displayed by the graphical user interface. In some embodiments, different requesting entities 910 are utilized by and/or otherwise correspond to different users of the object storage system 920, for example, where different users own, manage, and/or have permission to access different ones of the data objects 1-k.

The requesting entities 910 can correspond to edge nodes of the object storage system and/or can be a subset of a plurality of nodes of the cloud computing environment of the object storage system. While the requesting entities 910 are depicted separately from the object storage system in FIG. 9A, the requesting entities 910 can be components of the object storage system such as outermost nodes of a plurality of nodes of the object storage system, operable to store and/or retrieve data from storage units and/or deeper nodes of the object storage system via network 924 and/or a network of the object storage system and/or further to communicate with client devices and/or user devices as the outermost nodes of the object storage system. Alternatively, the requesting entities 910 can be entirely separate from the object storage system, and are only operable to communicate with the object storage system via access layer 922.

The memory 921 of the object storage system 920 can be implemented by utilizing DSN memory 22 and/or a plurality of storage units 36 to store the plurality of data objects 1-k. The memory 921 can otherwise include at least one other memory device operable to store the plurality of data objects 1-k. The object storage system 920 can include an access layer 922 that is operable to communicate with a plurality of requesting entities, for example, by storing data received from the requesting entity in deeper elements of the object storage system and/or within the storage units 36 of the object storage system, and/or by retrieving data objects stored in the deeper elements and/or storage units for transmission to one or more requesting entities. The access layer 922 can include at least one processor and memory, and can include the computing core 26 of FIG. 2. For example, the access layer 922 can be implemented by utilizing at least one computing device 16 of FIG. 1. In some embodiments, the access layer includes multiple elements such as multiple computing devices 16, and different requesting entities can transmit and receive communications from different elements of the access layer.

The memory 921 can store the objects 1-k across a plurality of buckets and/or identifiable virtual containers. For example, the object storage system can be implemented by utilizing a cloud platform such as the Amazon Web Services (AWS) cloud platform and/or can be implemented by utilizing an object storage service such as the Amazon Simple Storage Service (S3), and/or the plurality of buckets can be implemented by utilizing buckets of the object storage service, such as S3 buckets of the S3 object storage service.

The access layer 922 can be operable to communicate with storage units or other memory of the object storage system 920 to store and retrieve data object via a network of the object storage system 920. The object storage system can utilize the network 24 of FIG. 1 to enable access layer 922 to store and/or retrieve data objects from the plurality of storage units via the network 24. Alternatively or in addition, network 924 and/or can be integrated within the object storage system 920 to facilitate communication between the access layer and storage of the object storage system. Alternatively or in addition, a different wired and/or wireless network can be utilized within the object storage system 920 to facilitate communication between the access layer and storage of the object storage system.

In some embodiments, some or all data objects are dispersed stored by the object storage system 920 in a plurality of storage units as discussed in conjunction with FIGS. 3-8. Alternatively, some or all data objects are not dispersed stored, and are, for example, stored in each stored in a single location of the object storage system 920. The access layer 922 can be operable to perform a dispersed storage error encoding function on data segments of a data object received via network 924, for example, from a requesting entity 910 for storage. Alternatively, the access layer 922 can receive the encoded data slices from a requesting entity 910 via network 924, where the requesting entity 910 performed the dispersed storage error encoding function on data segments of the data object to generate the encoded data slices transmitted to the access layer 922. To store the data object, the access layer 922 can transmit the generated and/or received encoded data slices to an information dispersal algorithm (IDA) width threshold number of storage units in the object storage system 920 for storage, for example, via network 24.

The access layer 922 can retrieve at least an IDA decode threshold number of encoded data slices of each data segment of a stored data object from at least a corresponding IDA decode threshold number of storage units of the object storage system 920, for example, in response to a request to retrieve the data object received from a requesting entity 910 via network 924. The access layer 922 can utilize one or more of these computing devices 16 to perform a dispersed storage error decoding function on the retrieved encoded data slices to regenerate the requested data object, and can transmit the requested data object to the requesting entity 910. Alternatively, the access layer 922 can transmit the retrieved encoded data slices to the requesting entity 910, and the requesting entity can perform the dispersed storage error decoding function on the encoded data slices received from the access layer to regenerate the requested data object itself.

Request messages 1-m can indicate a request for access of one or more of the plurality of objects 1-k from at least one corresponding bucket of the memory 921. The response messages can include responses generated by the object storage system 920 in response to request messages 1-m. The request messages 1-m can be generated by the requesting entities 910 in accordance with an Application Program Interface (API) call, such as a Representational State Transfer (REST) API call. The object storage system 920 can support the REST interface, and/or the access layer 922 can otherwise interpret and/or execute received request messages. In some embodiments, the request messages can be generated by a requesting entity 910 based on user input to a graphical user interface displayed by a display device of a corresponding client device.

The request messages 1-m can include a pre-signed Uniform Resource Locator (URL). A creator 915 can create a pre-signed URL indicating a particular object for which the creator has access, such as a private data object stored in the object storage system 920 within a bucket owned by, managed by, or otherwise corresponding to the creator. For example, the creator 915 can be another requesting entity 910 and/or can correspond to any user and/or client device with data objects stored in the object storage system. The pre-signed URL can specify the private data object and can be utilized to provide access to the private data object to other requesting entities, provided that a creator of the pre-signed URL also has permissions to access that object for which the pre-signed URL is defined. Other requesting entities can include this pre-signed URL in their respective request messages for the particular object, and the object storage system 920 can evaluate this pre-signed URL received from the other requesting entity to determine if access to the specified object is provided. This can enable access to the specified object by other requesting entities 910 that do not have hash-based message authentication code (HMAC) credentials for the particular object and/or that require access to the particular object. In this fashion, the pre-signed URL can be utilized by the creator to securely provide short-term access to a private object in a particular user and/or particular requesting entity's bucket to other requesting entities 910 and/or other users.

Creator 915 can create a pre-signed URL to grant access to a bucket and/or an object of interest to which the creator has access. The pre-signed URL can indicate a bucket name to identify one of the plurality of buckets in which an object of interest is stored, an object key corresponding to the object of interest, a signature and/or other security credentials that identify the creator and/or verify that the creator has access to the object of interest, a request type, and/or expiration data indicating an expiration date and/or time. The pre-signed URL can include an access key, such as an AWS Access Key, which can be utilized to verify the credentials of the creator. The request type can indicate one or more HTTP methods, such as a PUT HTTP method for uploading objects and/or a GET HTTP method for retrieving objects. The creator can create the pre-signed URL by appending the access key, expiration data, and/or signature as query parameters to a base object URL, such as a base S3 object URL.

The creator 915 can share the pre-signed URL with other requesting entities 910, for example, via network 924, and/or can otherwise make the pre-signed URL publicly available to other requesting entities. Other requesting entities, once they have accessed the pre-signed URL via network 924, via direct transmission from the creator, and/or by otherwise accessing the pre-signed URL, can utilize the pre-signed URL in their request messages to the object storage system to access the particular object accordingly when the pre-signed URL is not expired.

Figure 9B:
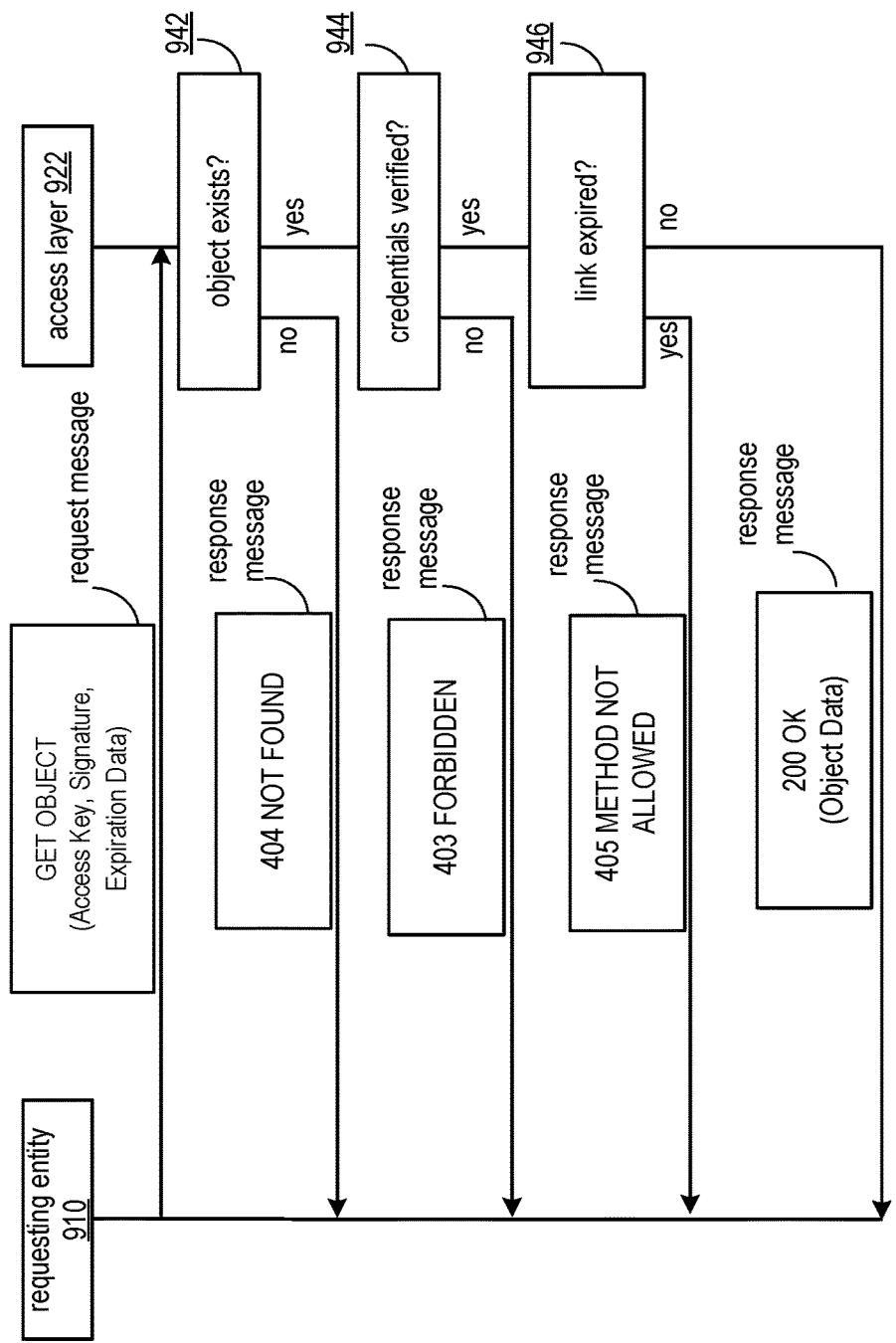
FIG. 9B is a flow diagram illustrating communication between a requesting entity and an object storage system in accordance with various embodiments of the present invention.

As illustrated in FIG. 9B, a requesting entity 910 can utilize transmit a request message to an object storage system that includes a pre-signed URL that was created by a creator 915. For example, the pre-signed URL can indicate a GET object request type, and can include the access key, the signature, and/or can include the expiration data. The access layer 922 of the object storage system can receive the request message from the requesting entity 910 and can perform step 942 by evaluating an object identifier indicating the object for which access is requested in the request message to determine whether or not the object exists. If the object does not exists, the access layer 922 can generate and transmit a response message to the requesting entity 910 indicating the object does not exist such as a 404 NOT FOUND response. If the object does exist, the access layer 922 can perform step 944 of verifying credentials by evaluating the access key, signature and/or other security credentials of the pre-signed URL to determine whether or not the creator of the pre-signed URL has access to the data object corresponding to the object identifier. If the credentials are not verified, the access layer 922 can generate and transmit a response message to the requesting entity 910 indicating the credential validation failed, such as a 403 FORBIDDEN response. If the credentials are verified, the access layer 922 can perform step 946 of determining whether or not the link is expired by evaluating the expiration data and comparing the expiration data to a current time and/or a timestamp associated with the request message. If the link is expired, the access layer 922 can generate and transmit a response message to the requesting entity 910 indicating the pre-signed URL is expired, such as a 405 METHOD NOT ALLOWED response. If the link is not expired, the access layer 922 can execute the request by retrieving the requested object from memory 921 and by transmitting content of the object or other requested object data in a response message to the requesting entity, for example, in a 200 OK response.

Utilizing the pre-signed URL as illustrated in FIG. 9B can be unideal because there are no limitations of the pre-signed URL to requests coming from specific IP address and/or range of IP addresses. Utilizing the pre-signed URL in this fashion can also be unideal because it only enables access to a single object, and requires multiple pre-signed URLs to be provided for different objects within the same bucket. The present invention presents improvements by enabling support of a custom policy with pre-signed URLs. In particular, pre-signed URL can be created by creator 915 to further include policy parameters indicating a custom policy, alternatively or in addition to the other query parameters of the pre-signed URL described above. The custom policy of the pre-signed URL can include additional parameters, for example, included as additional query parameters in creating pre-signed URLs as described above for transmission to the object storage system. This customized pre-signed URL can be generated and transmitted by a requesting entity 910 as its own request message to the object storage system 920, for example, where the policy parameters indicated in the customized pre-signed URL are generated based on user input to a graphical user interface displayed by a display device of a client device associated with the creator 915.

Figure 9C:
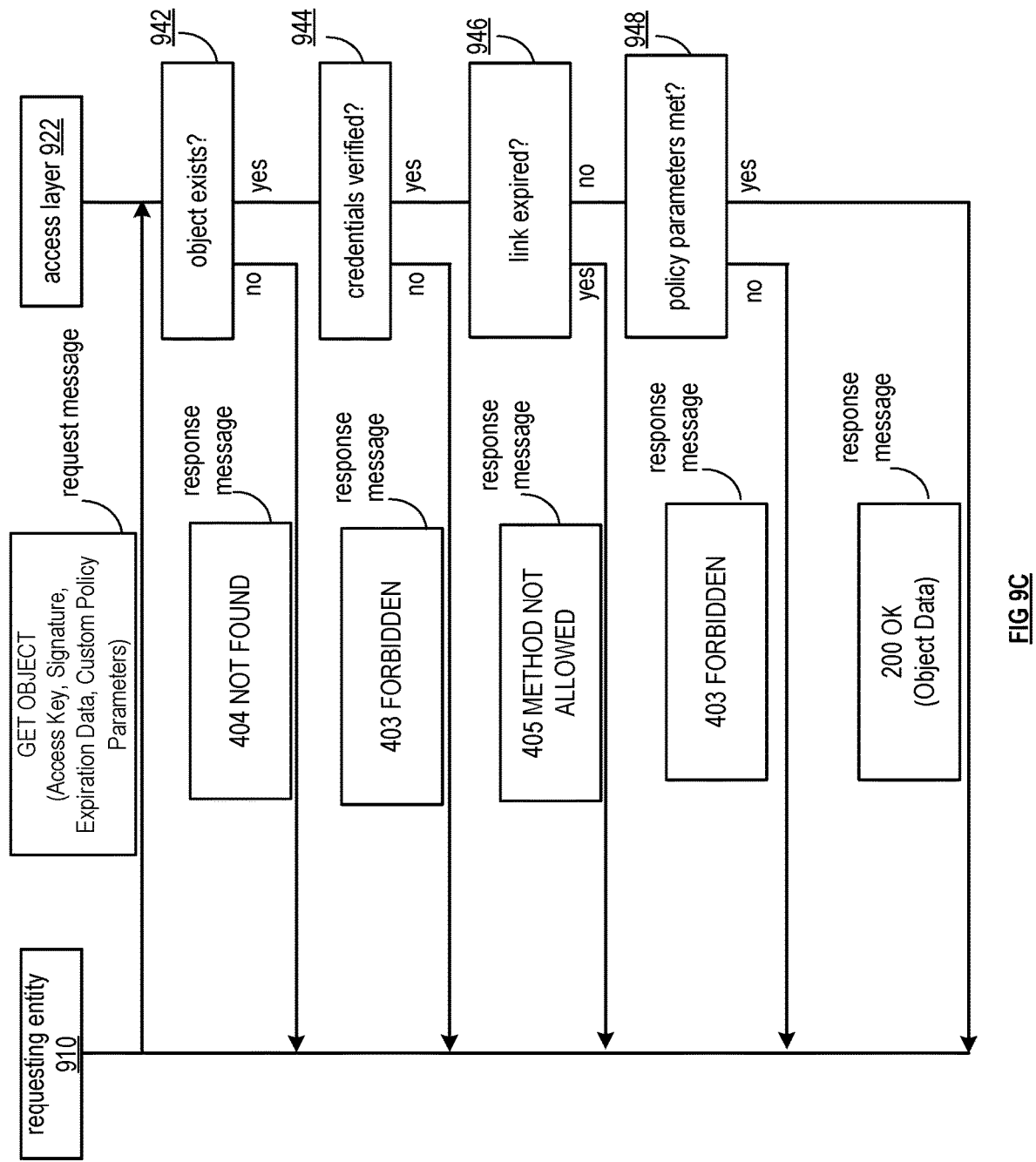
FIG. 9C is a flow diagram illustrating communication between a requesting entity and an object storage system in accordance with various embodiments of the present invention.

Such an embodiment is illustrated in FIG. 9C. Rather than granting access and executing the request once the link determined to be unexpired, the access layer 922 can further perform step 948 of determining whether custom policy parameters included in the pre-signed URL are met. The access layer 922 can execute the request by retrieving the requested object from memory 921 and by transmitting the object data in a response message to the requesting entity only when all of the custom policy parameters are determined to be met. Otherwise, the access layer 922 can generate and transmit a response message to the requesting entity 910 indicating that at least one custom policy parameter was not met, such as 403 FORBIDDEN response.

This custom policy of the customized pre-signed URL generated by creator 915 can identify a specific IP address or range of IP addresses to which access is granted. Alternatively or in addition, the custom policy of the customized pre-signed URL can identify one or more specific user-agents to which access is granted. Alternatively or in addition, the custom policy of the customized pre-signed URL can be HMAC, token and/or username based, allowing identifications particular requesting entities 910 or other users to which access is granted by indicating corresponding HMAC, token and/or usernames to which access is granted. The custom policy can indicate a non-zero, proper subset of all IP addresses, a non-zero, proper subset of all user-agents, and/or a non-zero proper subset of all requesting entities 910 that transmit request messages to the object storage system, allowing the custom policy to indicate at least one IP addresses, user, and/or requesting entity 910 to which access is not granted by the customized pre-signed URL.

This custom policy of the customized pre-signed URL can identify one or more object types to which access is granted, one or more object names to which access is granted, one or more object name prefixes to which access is granted, and/or can otherwise indicate one or more particular objects to which access is granted to the proper subset of IP addresses, user-agents, and/or requesting entities 910. A single customized pre-signed URL can indicate multiple objects within a bucket to which access is granted. In some embodiments, a non-zero, proper subset of object within a particular bucket indicated in the customized pre-signed URL are identified for access, where access is not granted for remaining objects by the customized pre-signed URL. In some embodiments, multiple customized pre-signed URLs can be generated by creator 915 to indicate different proper subsets of objects within a same bucket, where each customized pre-signed URL indicates a different proper subset of IP addresses, user-agents, and/or requesting entities 910 to which access is granted for the corresponding proper subset of objects in the bucket. This can be utilized to enable different entities to be granted access to different objects within the same bucket.

The customized pre-signed URL can further indicate parameters discussed with regards to the pre-signed URLs discussed above, such as the security credentials, bucket name, object key, request type, and/or the expiration date and time. This can be further utilized to designate which types of access is granted for the objects indicated in the customized pre-signed URL by the IP addresses, user-agents, and/or requesting entities 910 indicated by the customized pre-signed URL. Alternatively or in addition, this can be further utilized to designate the duration of access being granted for the objects indicated in the customized pre-signed URL by the IP addresses, user-agents, and/or requesting entities 910 indicated by the customized pre-signed URL. A creator 915 can generate multiple customized pre-signed URLs for different proper subsets of objects in the same bucket to designate that different objects in the same bucket have differing durations of access and/or have differing types of access that are granted, by the same or different set of IP addresses, user-agents, and/or requesting entities 910. Alternatively or in addition, a requesting entity can generate multiple customized pre-signed URLs for different proper subsets of IP addresses, user-agents, and/or requesting entities 910 to designate that different IP addresses, user-agents, and/or requesting entities have differing durations of access and/or have differing types of access that are granted, for the same or different set of objects.

Once the customized pre-signed URL is generated by creator 915, it can similarly be shared with requesting entities 910 as illustrated in FIG. 9A. Request messages 1-m received from other requesting entities 910 can include the customized pre-signed URL. In addition to determining whether the specified object exists, whether the provided credentials are verified, and/or whether or not the pre-signed URL is expired as discussed in conjunction with FIG. 9B, the object storage system 920 can further evaluate access is granted as based on determining whether or not all of the custom policy parameters are met.

While FIG. 9C illustrates evaluating and granting access for a GET pre-signed URL, a PUT pre-signed URL request can similarly include custom parameters, and these custom parameters of the PUT pre-signed URL can similarly be evaluated before execution of the PUT pre-signed URL request.

Figure 9D:
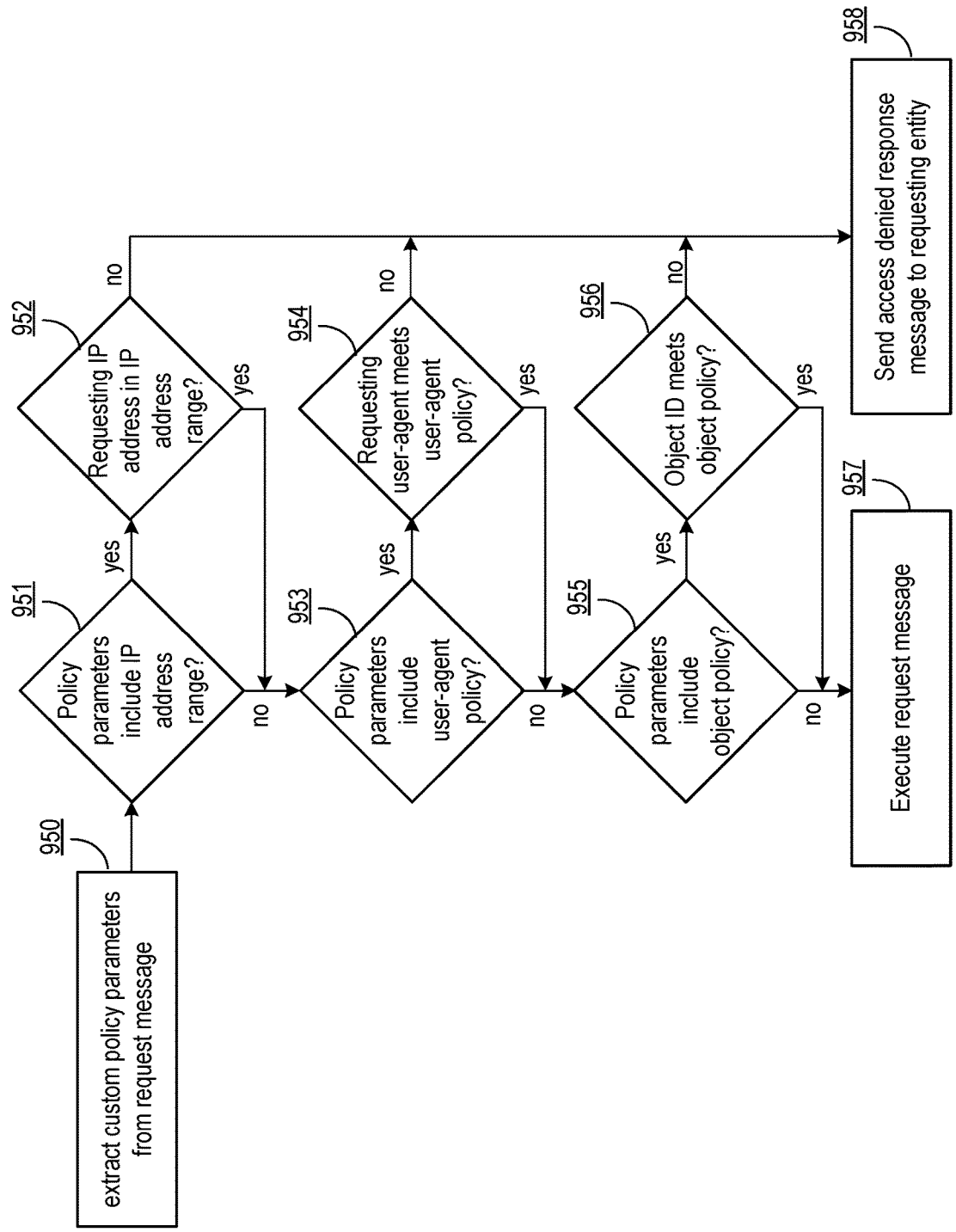
FIG. 9D is a flow diagram of an embodiment of a method for execution by an object storage system in accordance with various embodiments of the present invention.

FIG. 9D illustrates a flowchart depicting an example process of performing the step 948 of determining whether the custom policy parameters are met. The custom policy parameters can include a set of required conditions. This set of required conditions can include a requirement that the IP address of the requesting entity matches a specified IP address indicated in the custom policy parameters and/or falls within a specified range indicated in the custom policy parameters. This set of required conditions can alternatively or additionally include a requirement that a user-agent associated with the requesting entity 910 and/or identified in the request matches a specified user-agent and/or compares favorably to multiple allowed user-agents. This set of required conditions can alternatively or additionally include a requirement that the object indicated in the request falls within the range of object names, prefixes, and/or locations indicated in the request. If every condition is met, the access layer 922 can execute the request by retrieving the requested object from memory 921 and by transmitting the object data in a response message to the requesting entity only when all of the custom policy parameters are determined to be met.

Determining whether the set of required conditions is met can include determining corresponding attributes of the request message and/or requesting entity, such as the IP address of the requesting entity, HMACs, tokens, and/or usernames associated with the requesting entity and/or indicated in the request message, an object name, type, location and/or prefix indicated in the request message, the type of request indicated in the request message, and/or a timestamp associated with the request or current time. These attributes can be compared to the corresponding custom policy parameters such as the specific IP address or range of IP addresses to which access is granted, the one or more specific user-agents to which access is granted, one or more HMACs, tokens, and/or usernames to which access is granted, the one or more object types to which access is granted, the one or more object names to which access is granted, the one or more object name prefixes to which access is granted, the one or more access request types to which access is granted, and/or the expiration date and time indicating duration for which access is granted.

In the example method illustrated in FIG. 9D, performing step 948 of determining whether or not the policy parameters are met includes performing step 950, which includes extracting the custom policy parameters from the received request message. For example, the custom policy parameters can be received in a base64 encoded JSON blob of the request message. The method can proceed to step 951, which includes determining whether the extracted policy parameters indicate a required IP address range and/or indicate any IP address requirements. If so, the method proceeds to step 952, which includes determining whether the IP address of the requesting entity 910 from which the request message was received is in the corresponding IP address range indicated in the policy parameters. This can include determining an X-Forwarded-For within and/or associated with the request message, and determining if the corresponding IP address meets the IP address requirements of the policy parameters. If the requesting IP address from which the request message was received is not in the corresponding IP address range indicated in the policy parameters of the pre-signed URL, the method proceeds to step 958, which includes sending an access denied response message to the requesting entity 910. This can include generating and sending a 403 FORBIDDEN message to the requesting entity.

If the requesting IP address from which the request message was received is within or otherwise compares favorably to the IP address range indicated in the policy parameters, or if the policy parameters do not include any IP address range requirements, the method proceeds to step 953, which includes determining whether the policy parameters include a user-agent policy, such as an indication of one or more user-agents allowed to access the one or more objects of the pre-signed URL. If so, the method proceeds to step 954, which includes determining whether a user-agent associated with the request message matches and/or compares favorably to the user-agent policy. This can include determining the user-agent that generated the request message, that sent the request message, and/or that is associated with requesting entity 910 based an indication in the request message, such as an HMAC, token, and/or user name identifying the user-agent in the request message. If the user-agent associated with the request message does not meet or otherwise compares unfavorably to the user-agent policy indicated in the pre-signed URL, the access denied response message is sent to the requesting entity 910 by performing step 958.

If the user-agent associated with the request message compares favorably to the user-agent requirements indicated in the policy parameters, or if the policy parameters do not include any user-agent requirements, the method proceeds to step 955, which includes determining whether the policy parameters include an object policy. If so, the method proceeds to step 956, which includes determining whether an object identifier for the object requested for access in the request message compares favorably to the object policy. This can include determining whether an object requested to be read and/or written in the request has a name, type, prefix, and/or other attributes that match or otherwise compare favorably to the corresponding requirements of the object policy. If the object identifier compares unfavorably to the object policy indicated in the pre-signed URL, the access denied response message is sent to the requesting entity 910 by performing step 958.

If the object indicated for access in the request message compares favorably to the object requirements indicated in the policy parameters, or if the policy parameters do not include any object policy, the method proceeds to step 957, which includes executing the request message. This can include performing the access of the pre-signed URL such as a GET or PUT access. This can further include generating a response message such as the 200 OK message, which can confirm the execution of the access and/or include the object data requested in the access. Alternatively, the method can require checking whether additional types of policies are included in the policy parameters, where the access is executed only if every additional type of policy determined to be included in the policy parameters is also met. While steps 951, 953, and 955 are depicted to be performed sequentially, these steps can be performed in any order, can be performed in tandem, and/or can be performed with additional checks for additional types of policy parameters before, after, or in between these steps.

This mechanism of utilizing customized pre-signed URLs ensures users are only allowed to access one or more objects indicated in the customized pre-signed URL only for specific request type indicated in the customized pre-signed URL, only for a specific duration indicated in the customized pre-signed URL, and/or only from IP addresses, user-agents, and/or requesting entities indicated in the customized pre-signed URL. Utilizing pre-signed URL that authorizes access to objects only under these customizable conditions improves existing systems by enhances security in object storage systems. In particular, this mechanism increases security by ensuring URLs cannot be used by anyone and everyone and by URLs that work for only specific clients indicated by client IP address range and/or as user agents. Furthermore, this mechanism provides more convenience as supposed to single object pre-signed URLs by enabling a plurality of objects within a same bucket using the same URL to be indicated.

The custom policy can identify some or all of this additional information as a JavaScript Object Notation (JSON) blob. Alternatively or in addition, some or all of this additional information can be base64 encoded. For example, the custom policy can be identified as a JSON blob that is a base64 encoded.

As a particular example, the custom policy JSON blob for pre-signed URL generated by creator 915 and/or included in a request message transmitted by a requesting entity 910 can be formatted as follows:

```
{
    "Resource":"<Specific object or Prefix>",
    "Condition":{
        "ClientIpAddress":{"ClientIP":"192.168.1.0/24"}
        "UserAgent":{"UserAgent":"ibm-cos-sdk-java"}
        }
}
```

This blob can then be base64 encoded and added as a query parameter in the URL, along with an AWS Access Key or other access key, an expiration time and/or signature or other credentials as query parameters. As a particular example, a pre-signed URL for a GET HTTP method generated by creator 915 and/or included in a request message transmitted by a requesting entity 910 can be formatted as follows:

https://<End Point Address/<Object Name>?AWSAccessKeyId=<AWS Key>&Signature=<V4 Signature>&Expires=1531446995&Policy= ewogICAgICAgICAiUmVzb3VyY2UiOi I8U3B1Y21maWMgb2JqZWN0IG9yIFBy ZWZpeD4iLCAKICAgICAgICAgIkNvbm RpdGlvbiI6eyAKICAgICAgICAgICAgICAg ICAgICAgICAgICAgICAgICAgICAiQ 2xpZW50SXBBBZGRyZXNzIjp7IkNsaWVVud ElQIjoiMTkyLjE2OC4xLjAvMjQifQo gICAgICAgICAgICAgICAgICAgICAgIC AgICAgICAgICJVc2VyQWdlbnQiOi nsiVXN1ckFnZW50IjoiaWRLWNvcy1zZ GstamF2YSJ9CiAgICAgICAgICAgI CAgICAgICAgICAgICB9Cn0K The query parameter Policy can have the base 64 encoded value of the JSON blob above, as indicated with the example values shown above. The AWSAccessKeyID parameter can be replaced with IAMToken and/or username based on the type of credentials intended to be used and/or types of credentials that are is supported by the system.

In various embodiments, a processing system of an access layer of an object storage system includes at least one processor and a memory that stores operational instructions, that when executed by the at least one processor cause the processing system to receive a request message from a requesting entity via a network, where the request message includes a pre-signed URL. A set of custom policy parameters are extracted from the pre-signed URL. A set of attributes of the request message that correspond to the set of custom policy parameters are determined. Policy verification data is generated by comparing each attribute of the set of attributes to a corresponding custom policy parameter of the set of custom policy parameters. An access indicated in the request message is executed in response to the policy verification data indicating that the each attribute of the set of attributes compares favorably to the corresponding custom policy parameter of the set of custom policy parameters. An access denial response message is transmitted to the requesting entity via the network in response to the policy verification data indicating that at least one of the set of attributes compares unfavorably to the corresponding custom policy parameter of the set of custom policy parameters.

FIG. 10 is a flowchart illustrating an example of processing pre-signed URLs. In particular, a method is presented for use in association with one or more functions and features described in conjunction with FIGS. 1-9D, for execution by a computing device of an access layer of an object storage system that includes a processor or via another processing system of a dispersed storage network that includes at least one processor and memory that stores instruction that configure the processor or processors to perform the steps described below.

Step 1002 includes receiving a first request message from a first requesting entity via a network, where the first request message includes a first pre-signed URL. Step 1004 includes extracting a first set of custom policy parameters from the first pre-signed URL. In various embodiments, the first set of custom policy parameters are formatted as base64 encoded JavaScript Object Notation (JSON) blob included in query parameters of a base object URL. Step 1006 includes determining a first set of attributes of the first request message that correspond to the first set of custom policy parameters. Step 1008 includes generating first policy verification data by comparing each attribute of the first set of attributes to a corresponding custom policy parameter of the first set of custom policy parameters. Step 1010 includes executing a first access indicated in the first request message in response to the first policy verification data indicating that the each attribute of the first set of attributes compares favorably to the corresponding custom policy parameter of the first set of custom policy parameters.

In various embodiments, the method further includes receiving a second request message from a second requesting entity via the network, where the second request message includes a second pre-signed URL. The method further includes extracting a second set of custom policy parameters from the second pre-signed URL and determining a second set of attributes of the second request message that correspond to the second set of custom policy parameters. The method further includes generating second policy verification data by comparing each attribute of the second set of attributes to a corresponding custom policy parameter of the second set of custom policy parameters. The method further includes transmitting an access denial response message to the second requesting entity via the network in response to the second policy verification data indicating that at least one of the second set of attributes compares unfavorably to the corresponding custom policy parameter of the second set of custom policy parameters.

In various embodiments, the first set of custom policy parameters includes an IP address requirement that indicates an IP address range. Determining one of the first set of attributes corresponding the IP address requirement includes determining an originating IP address corresponding to the first requesting entity and/or determining an originating IP address from which the first request message was transmitted. Generating the first policy verification data includes determining whether the originating IP address falls within the IP address range.

In various embodiments, the first set of custom policy parameters includes a user-agent requirement identifying at least one user-agent to which access is allowed. Determining one of the first set of attributes corresponding to the user-agent requirement includes determining a user-agent associated with the first request message. Generating the first policy verification data includes determining whether the user-agent associated with the first request message compares favorably to the at least one user-agent identified in the user-agent requirement.

In various embodiments, the first set of custom policy parameters includes an object requirement. Determining one of the first set of attributes corresponding to the object requirement includes determining an identifier of a requested object indicated in the first request message. Generating the first policy verification data includes determining whether the identifier of the requested object compares favorably to the object requirement. In various embodiments, the object requirement indicates a plurality of object identifiers, and generating the first policy verification data includes determining whether the identifier of the requested object matches one of the plurality of object identifiers. In various embodiments, the object requirement indicates a required object name prefix, and generating the first policy verification data includes determining whether a prefix of the identifier of the requested object compares favorably to the required object name prefix. In various embodiments, the object requirement indicates a required one of a plurality of object types, and generating the first policy verification data includes determining whether an object type of the requested object compares favorably to the required one of the plurality of object types.

In various embodiments, the first pre-signed URL further indicates expiration data. The method further includes determining whether a timestamp associated with the first request message compares favorably to the expiration data. The first access is executed in further response to determining the timestamp associated with the first request message compares favorably to the expiration data. In various embodiments, a creator generated the first pre-signed URL and a second pre-signed URL that includes a second set of custom policy parameters. The first pre-signed URL and the second pre-signed URL a same object, and the second set of custom policy parameters are different from the first set of custom policy parameters.

In various embodiments, a non-transitory computer readable storage medium includes at least one memory section that stores operational instructions that, when executed by a processing system of a dispersed storage network (DSN) that includes a processor and a memory, causes the processing system to receive a request message from a requesting entity via a network, where the request message includes a pre-signed URL. A set of custom policy parameters are extracted from the pre-signed URL. A set of attributes of the request message that correspond to the set of custom policy parameters are determined. Policy verification data is generated by comparing each attribute of the set of attributes to a corresponding custom policy parameter of the set of custom policy parameters. An access indicated in the request message is executed in response to the policy verification data indicating that the each attribute of the set of attributes compares favorably to the corresponding custom policy parameter of the set of custom policy parameters. An access denial response message is transmitted to the requesting entity via the network in response to the policy verification data indicating that at least one of the set of attributes compares unfavorably to the corresponding custom policy parameter of the set of custom policy parameters.

Figure 11:
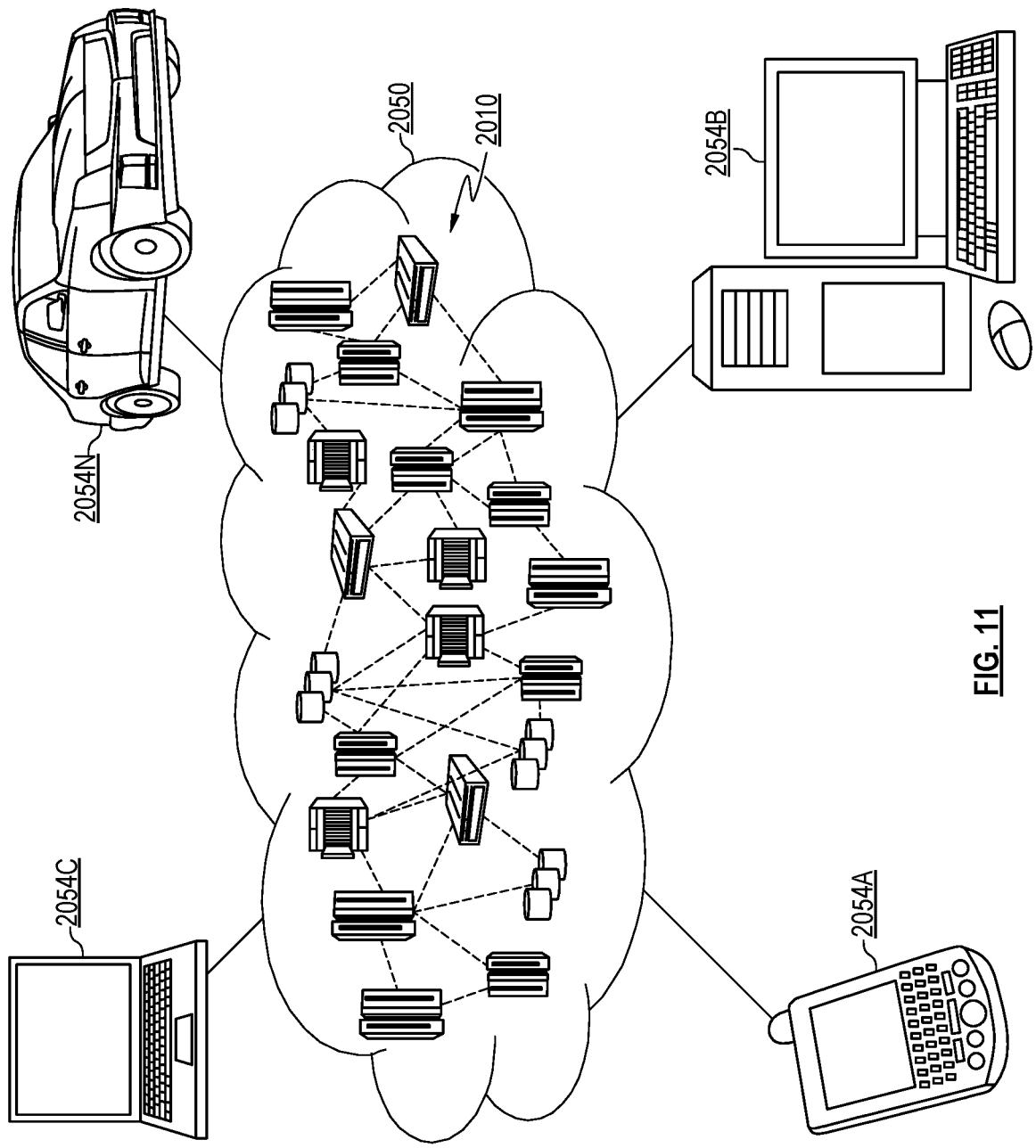
FIG. 11 depicts a cloud computing environment according to an embodiment of the present invention.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
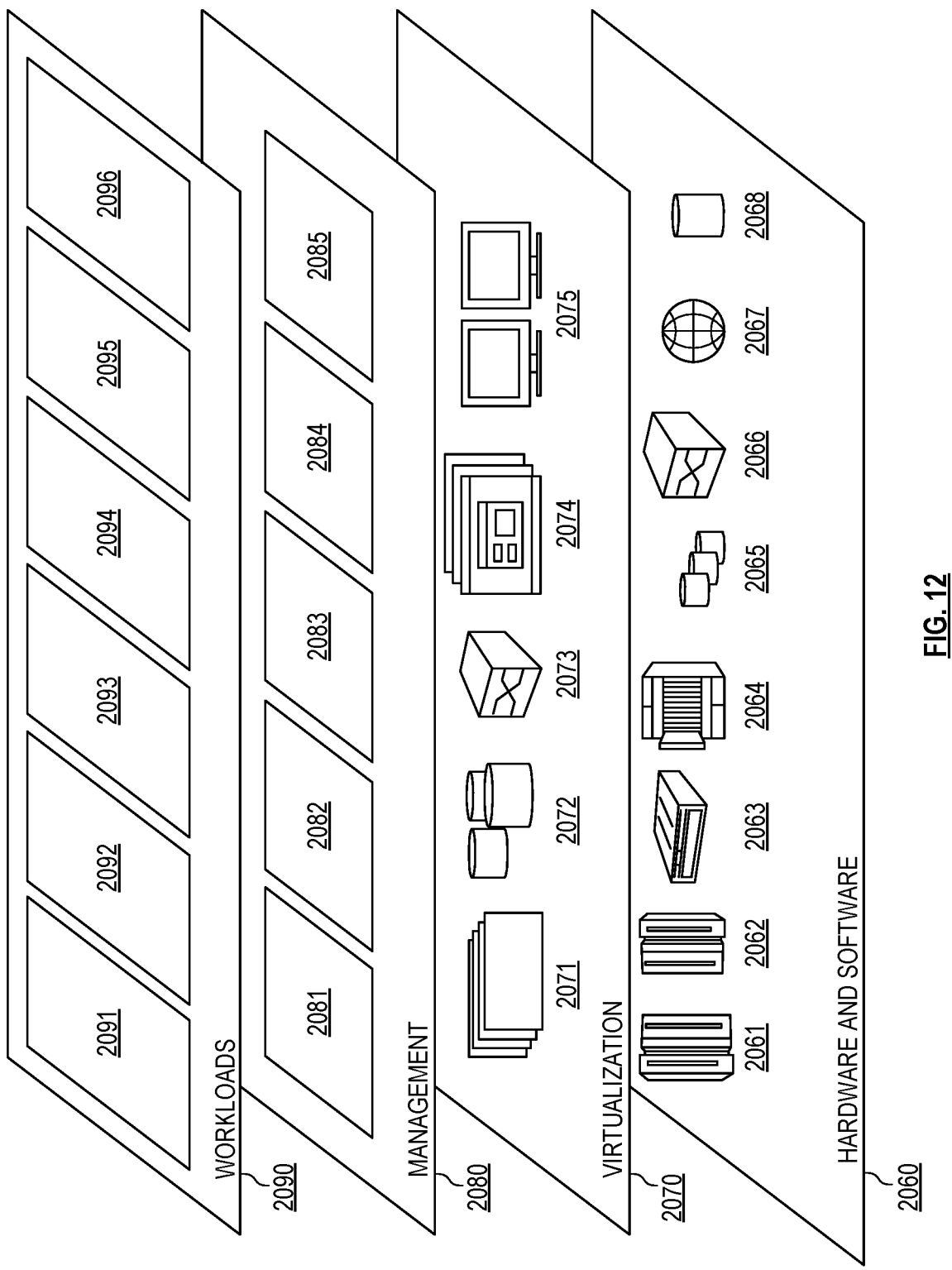
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and pre-signed URL processing 2096.

In some embodiments, the DSN 10 and/or the object storage system 920 can utilize utilizing the cloud computing environment 2050, for example, by utilizing the pre-signed URL processing 2096 of the workloads layer 2090 of FIG. 12 to process pre-signed URLs in the DSN and/or in the object storage system as described in conjunction with FIGS. 1-10. Some or all computing devices 12-16 of FIG. 1 and/or requesting entities 910 of FIG. 9A can be implemented by utilizing a cloud computing node 2010 and/or can otherwise be operable to communicate with the object storage system 920 via a corresponding node 2010 of the cloud computing environment 2050. Alternatively or in addition, the object storage system 920 can be implemented by utilizing the cloud computing environment 2050 and/or by utilizing a plurality of cloud computing nodes 2010. For example, the access layer 922 can be implemented by utilizing one or more corresponding cloud computing nodes 2010. In some embodiments, requesting entities 910 can be implemented by utilizing a computing device used by cloud consumers, such as, for example, personal digital assistant (PDA) or cellular telephone 2054A, desktop computer 2054B, laptop computer 2054C, and/or automobile computer system 2054N.

Figure 13:
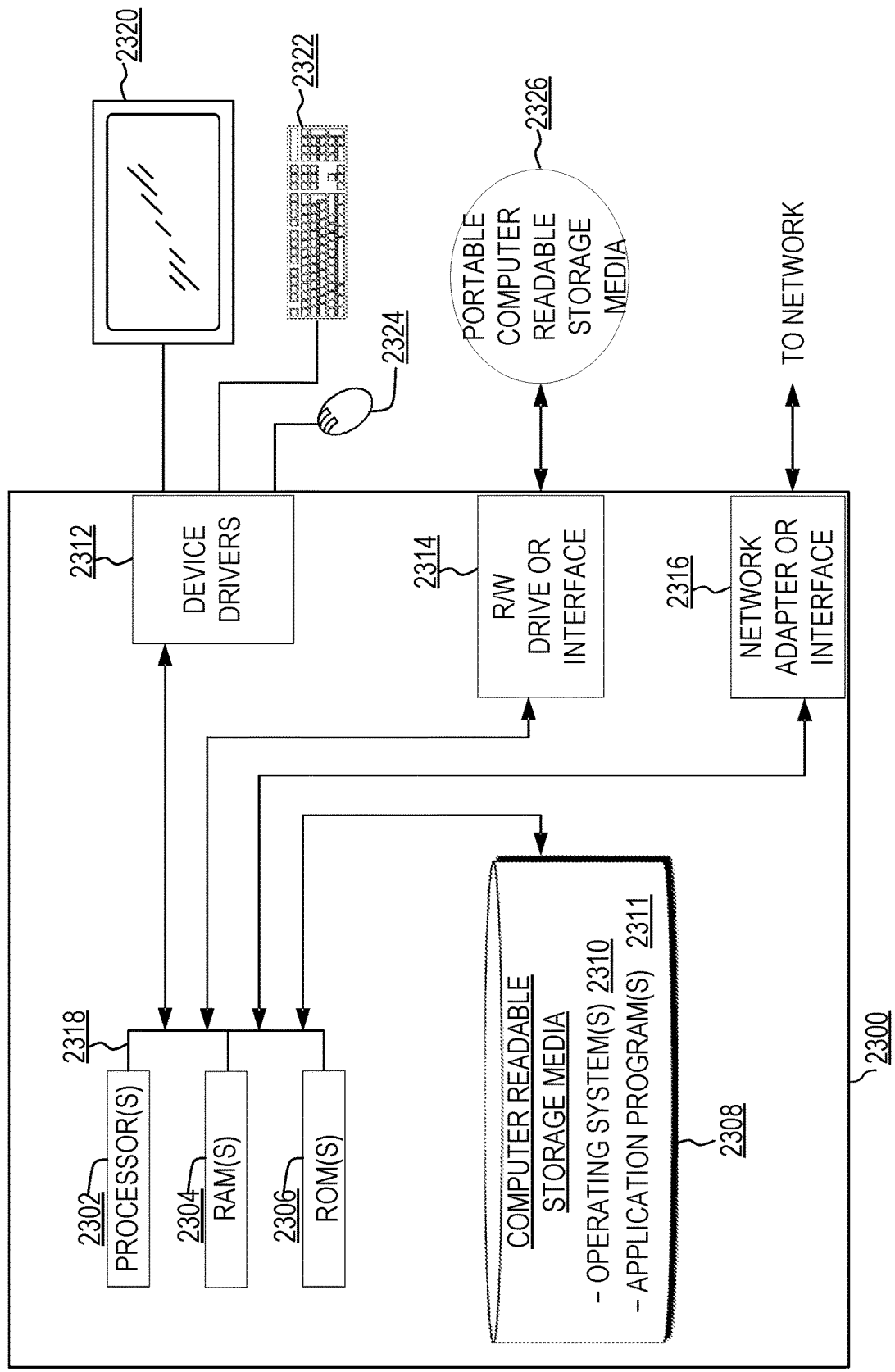
FIG. 13 depicts a block diagram of a computing device according to various embodiments of the present invention.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by an access layer of an object storage system that includes a processor, the method comprises:
   receiving a first request message from a first requesting entity via a network, wherein the first request message includes a first pre-signed Uniform Resource Locator (URL) created by an entity granting access to a data object identified by the pre-signed URL, the first pre-signed URL providing access to the data object by the first requesting entity otherwise unauthorized to access the data object identified in the first request message without the pre-signed URL, wherein the first request message is a request to access the data object that is stored as a plurality of encoded data slices in the object storage system;
   extracting a first set of custom policy parameters from the first pre-signed URL;
   determining a first set of attributes of the first request message that correspond to the first set of custom policy parameters;
   generating first policy verification data by comparing each attribute of the first set of attributes to a corresponding custom policy parameter of the first set of custom policy parameters; and
   executing a first access indicated in the first request message in response to the first policy verification data indicating that the each attribute of the first set of attributes compares favorably to the corresponding custom policy parameter of the first set of custom policy parameters.

2. The method of claim 1, further comprising:
   receiving a second request message from a second requesting entity via the network, wherein the second request message includes a second pre-signed URL;
   extracting a second set of custom policy parameters from the second pre-signed URL;
   determining a second set of attributes of the second request message that correspond to the second set of custom policy parameters;
   generating second policy verification data by comparing each attribute of the second set of attributes to a corresponding custom policy parameter of the second set of custom policy parameters; and
   transmitting an access denial response message to the second requesting entity via the network in response to the second policy verification data indicating that at least one of the second set of attributes compares unfavorably to the corresponding custom policy parameter of the second set of custom policy parameters.

3. The method of claim 1, wherein the first set of custom policy parameters includes an IP address requirement that indicates an IP address range, wherein determining one of the first set of attributes corresponding the IP address requirement includes determining an originating IP address corresponding to the first requesting entity, and wherein generating the first policy verification data includes determining whether the originating IP address falls within the IP address range.

4. The method of claim 3, wherein the first set of custom policy parameters further includes a user-agent requirement identifying at least one user-agent to which access is allowed, wherein determining one of the first set of attributes corresponding to the user-agent requirement includes determining a user-agent associated with the first request message, and wherein generating the first policy verification data includes determining whether the user-agent associated with the first request message compares favorably to the at least one user-agent identified in the user-agent requirement.

5. The method of claim 3, wherein the first set of custom policy parameters further includes an object requirement, wherein determining one of the first set of attributes corresponding to the object requirement includes determining an identifier of a requested object indicated in the first request message, and wherein generating the first policy verification data includes determining whether the identifier of the requested object compares favorably to the object requirement.

6. The method of claim 5, wherein the object requirement indicates a plurality of object identifiers, and wherein generating the first policy verification data includes determining whether the identifier of the requested object matches one of the plurality of object identifiers.

7. The method of claim 5, wherein the object requirement indicates a required object name prefix, and wherein generating the first policy verification data includes determining whether a prefix of the identifier of the requested object compares favorably to the required object name prefix.

8. The method of claim 5, wherein the object requirement indicates a required one of a plurality of object types, and wherein generating the first policy verification data includes determining whether an object type of the requested object compares favorably to the required one of the plurality of object types.

9. The method of claim 1, wherein the first pre-signed URL further indicates expiration data, and wherein the method further includes determining whether a timestamp associated with the first request message compares favorably to the expiration data, wherein the first access is executed in further response to determining the timestamp associated with the first request message compares favorably to the expiration data.

10. The method of claim 1, wherein the first set of custom policy parameters are formatted as base64 encoded JavaScript Object Notation (JSON) blob included in query parameters of a base object URL.

11. The method of claim 1, wherein a creator generated the first pre-signed URL and a second pre-signed URL that includes a second set of custom policy parameters, wherein the first pre-signed URL and the second pre-signed URL a same object, and wherein the second set of custom policy parameters are different from the first set of custom policy parameters.

12. A processing system of an access layer of an object storage system comprises:
   at least one processor;
   a memory that stores operational instructions, that when executed by the at least one processor cause the processing system to:
      receive a first request message from a first requesting entity via a network, wherein the first request message includes a first pre-signed Uniform Resource Locator (URL) created by an entity granting access to a data object identified by the pre-signed URL, the first pre-signed URL providing access to the data object by the first requesting entity otherwise unauthorized to access the data object identified in the first request message without the pre-signed URL, wherein the first request message is a request to access the data object that is stored as a plurality of encoded data slices in the object storage system, and the access layer generates the plurality of encoded data slices using an information dispersal algorithm;

extract a first set of custom policy parameters from the first pre-signed URL;

determine a first set of attributes of the first request message that correspond to the first set of custom policy parameters;

generate first policy verification data by comparing each attribute of the first set of attributes to a corresponding custom policy parameter of the first set of custom policy parameters; and execute a first access indicated in the first request message in response to the first policy verification data indicating that the each attribute of the first set of attributes compares favorably to the corresponding custom policy parameter of the first set of custom policy parameters.

13. The processing system of claim 12, wherein the operational instructions, when executed by the at least one processor, further cause the processing system to:

receive a second request message from a second requesting entity via the network, wherein the second request message includes a second pre-signed URL;

extract a second set of custom policy parameters from the second pre-signed URL;

determine a second set of attributes of the second request message that correspond to the second set of custom policy parameters;

generate second policy verification data by comparing each attribute of the second set of attributes to a corresponding custom policy parameter of the second set of custom policy parameters; and transmit an access denial response message to the second requesting entity via the network in response to the second policy verification data indicating that at least one of the second set of attributes compares unfavorably to the corresponding custom policy parameter of the second set of custom policy parameters.

14. The processing system of claim 12, wherein the first set of custom policy parameters includes an IP address requirement that indicates an IP address range, wherein determining one of the first set of attributes corresponding the IP address requirement includes determining an originating IP address corresponding to the first requesting entity, and wherein generating the first policy verification data includes determining whether the originating IP address falls within the IP address range.

15. The processing system of claim 14, wherein the first set of custom policy parameters further includes a user-agent requirement identifying at least one user-agent to which access is allowed, wherein determining one of the first set of attributes corresponding to the user-agent requirement includes determining a user-agent associated with the first request message, and wherein generating the first policy verification data includes determining whether the user-agent associated with the first request message compares favorably to the at least one user-agent identified in the user-agent requirement.

16. The processing system of claim 14, wherein the first set of custom policy parameters further includes an object requirement, wherein determining one of the first set of attributes corresponding to the object requirement includes determining an identifier of a requested object indicated in the first request message, and wherein generating the first policy verification data includes determining whether the identifier of the requested object compares favorably to the object requirement.

17. The processing system of claim 16, wherein the object requirement indicates a required object name prefix, and wherein generating the first policy verification data includes determining whether a prefix of the identifier of the requested object compares favorably to the required object name prefix.

18. The processing system of claim 16, wherein the object requirement indicates a required one of a plurality of object types, and wherein generating the first policy verification data includes determining whether an object type of the requested object compares favorably to the required one of the plurality of object types.

19. The processing system of claim 12, wherein the first set of custom policy parameters are formatted as base64 encoded JavaScript Object Notation (JSON) blob included in query parameters of a base object URL.

20. A computer readable storage medium comprises:

at least one memory section that stores operational instructions that, when executed by a processing system that includes a processor and a memory, causes the processing system to:

receive a first request message from a first requesting entity via a network, wherein the first request message includes a first pre-signed Uniform Resource Locator (URL) created by an entity granting access to a data object identified by the pre-signed URL, the first pre-signed URL providing access to the data object by the first requesting entity otherwise unauthorized to access the data object identified in the first request message without the pre-signed URL, wherein the first request message is a request to access theft data object that is stored as a plurality of encoded data slices in the object storage system, and the access layer receives the plurality of encoded data slices from another device that generated the plurality of encoded data slices by performing a dispersed storage error encoding function on data segments of the data object;

extract a first set of custom policy parameters from the first pre-signed URL;

determine a first set of attributes of the first request message that correspond to the first set of custom policy parameters;

generate first policy verification data by comparing each attribute of the first set of attributes to a corresponding custom policy parameter of the first set of custom policy parameters; and execute a first access indicated in the first request message in response to the first policy verification data indicating that the each attribute of the first set of attributes compares favorably to the corresponding custom policy parameter of the first set of custom policy parameters.

* * * * *